Figure 1:
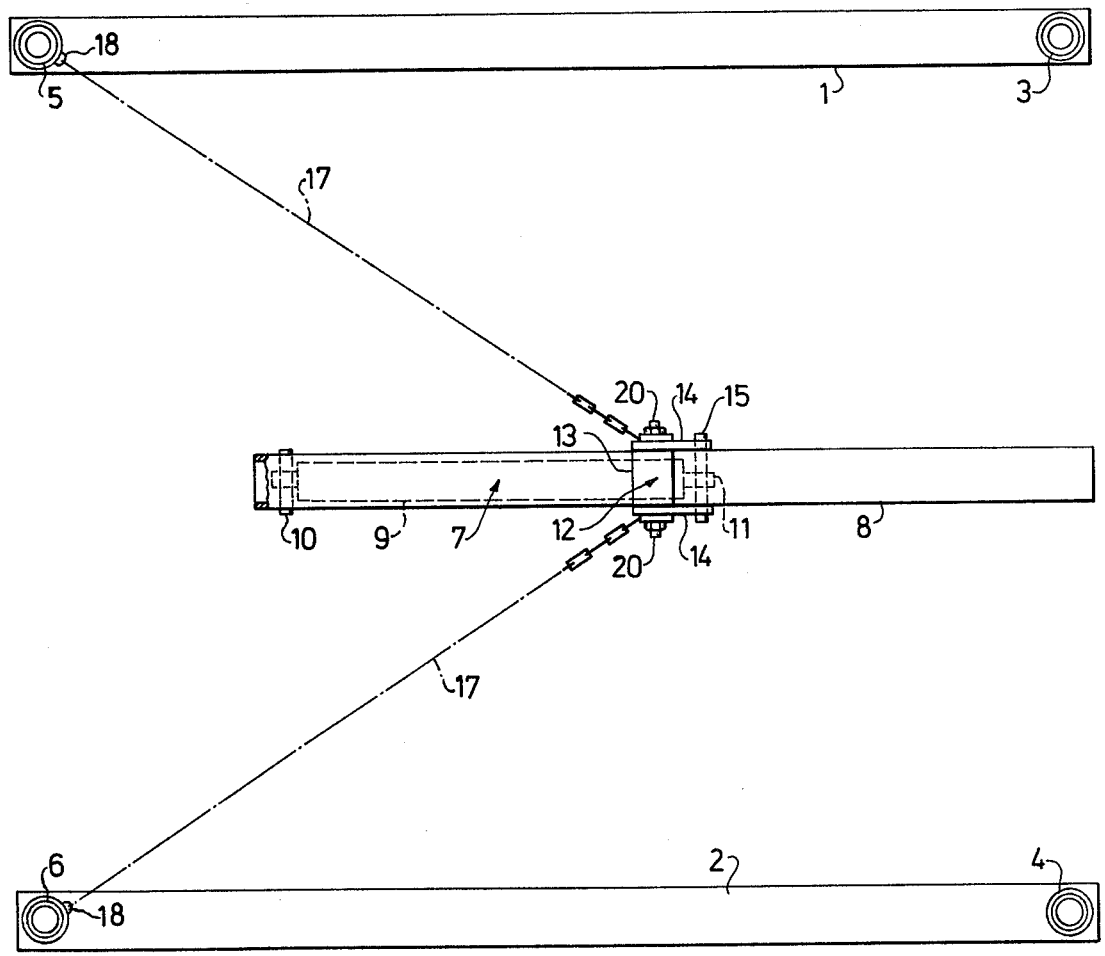

United States Patent [19]

Nordin

[11] 4,094,421
[45] June 13, 1978

[54] DEVICE FOR UNLOADING OF TIMBER

[76] Inventor: Bengt Anders Nordin, Tåsjö-Lövvik, Hoting, Sweden

[21] Appl. No.: 736,933

[22] Filed: Oct. 29, 1976

[30] Foreign Application Priority Data

Nov. 3, 1975 Sweden .............................. 7512271
Sep. 24, 1976 Sweden .............................. 7610613
Sep. 24, 1976 Sweden .............................. 7610614

[51] Int. Cl.² ............................................. B60P 1/00
[52] U.S. Cl. ..................................................... 214/82
[58] Field of Search ................. 214/82, 85, 85.1, 510, 214/514, 146 E, 767, 17 D, 77 R; 280/143–148; 298/1 B

[56] References Cited

U.S. PATENT DOCUMENTS

| 685,681 | 10/1901 | Hasey | 214/82 |
| 2,284,661 | 6/1942 | Joy | 214/82 |
| 2,573,584 | 10/1951 | Le Tourneau | 214/82 |
| 2,605,915 | 8/1952 | Day | 214/82 |
| 3,305,262 | 2/1967 | Lull | 214/82 X |
| 3,549,030 | 12/1970 | Coughran, Jr. | 214/85 |

FOREIGN PATENT DOCUMENTS 211,193  5/1968  U.S.S.R. ............................. 414/527

Primary Examiner—Albert J. Makay
Attorney, Agent, or Firm—Haseltine, Lake & Waters

[57] ABSTRACT

The present invention concerns a device for unloading timber stacked on a support, for instance on timber bunks of a vehicle, said device comprising at least one elongated flexible element, such as a chain, line or the like, which loosely passes beneath said stacked timber and has one end secured to a stake at a distance upwards from said support and the other end situated under said stacked timber, said other end being movable transversally of the longitudinally extension of said timber to tighten said elongated flexible element, so that same forms a sloping ramp along which said timber glides or rolls down from said support.

4 Claims, 5 Drawing Figures

DEVICE FOR UNLOADING OF TIMBER

The present invention concerns a device by means of which timber stacked on a support such as timber bunks, for instance on a vehicle, is unloaded by tensioning at least one elongated flexible element, such as a chain, line or the like, which loosely passes under said stacked timber.

Devices for unloading timber are i.e. known from the French patent specifications Nos. 1,230,608 and 1,197,098, in which a line is passed from a fixed point on the vehicle under the timber and over the top part of a stake, the other end of the line being attached to means for tensioning the line. Said known devices have a rather complicated construction, partly due to the fact that they are also arranged to load timber onto the vehicle and therefore, are comparatively prone to damages under the rough conditions during transport of timber.

The main object of the present invention is to provide a device for unloading timber, which device is relatively cheap to manufacture and has a simple construction, so that it is less susceptible to damages when used.

Another object of the invention is to provide a device of the type stated, which easily may be controlled from a place remote from the stacked timber, for instance from the driver cabin of the vehicle, so that the risks of accidents are eliminated.

This is mainly accomplished by the fact that the device comprises at least one elongated flexible element, such as a chain, line and the like, which loosely passes under said stacked timber and has one end secured to a stake at a distance upwards from said support, the other end thereof being situated under said stacked timber and being movable transversally of the longitudinal extension of said timber to tighten said elongated flexible element, so that same forms a sloping ramp along which said timber slides or rolls down from said support.

Figure 2:
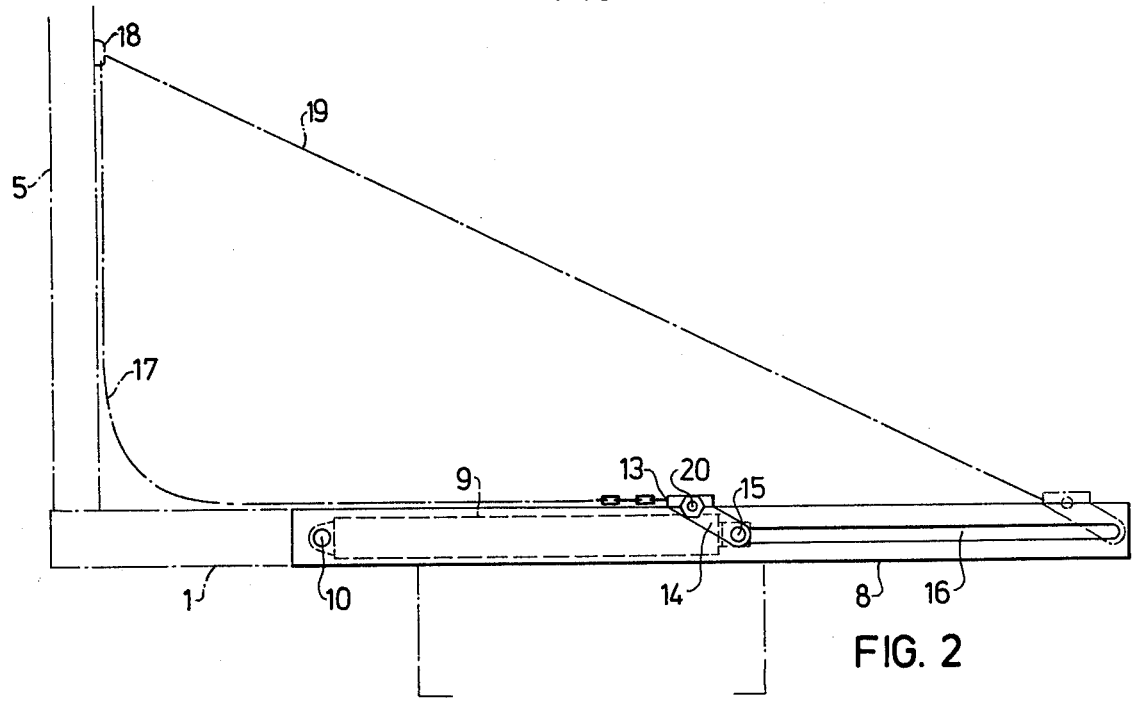

Further advantageous features of the invented device will be evident from the following detailed description of some preferred embodiments of the invention under reference to the attached drawings of which FIG. 1 shows a first embodiment of the device according to the invention as viewed from above, FIG. 2 is an elevation of the device of FIG. 1 and FIGS. 3 - 5 show three further embodiments of the device according to the invention.

The device for unloading timber according to the present invention may be mounted on the bridge of a truck for timber transport between two timber bunks 1, 2 having vertical stakes 3, 4, 5, 6, of which the stakes 3, 4 situated on one side of the truck may be swung down, while the two stakes 5, 6 on the other side are stationary. A prime mover 7 for the unloading device is arranged between said timber bunks 1, 2 and comprises a hydraulic jack enclosed in a tube 8, the cylinder 7 of the jack being connected to the tube by means of a trunion 10 extending perpendicularly through said tube 8 at the end thereof close to said stationary stakes 5, 6. The piston rod 11 of the jack 7 is connected to a slide member 12, comprising a rectangular plate 13, which is slideable along the top side of said tube 8. Arms 14, 14 extend obliquely downwards from the ends of said plate 13, and are connected to said piston rod 11 over a pivot 15, extending transversally of said tube 8. The pivot 15 passes through two diametrically opposed, longitudinal slots 16 of said tube 8, which slots guide the movement of the slide member 12 along said tube 8. The tube extends longitudinally beyond the cylinder 9 of said jack 7 a distance which at least is equal to the working stroke of said jack. A bolt 20 is arranged at the top end of each arm 14 and one end of a chain 17 is secured to each bolt, while the other ends of said chains are attached to each one of said stationary stakes 5, 6 at points 18 a distance above the lower ends thereof, said stakes being laterally spaced from said jack 7. The length of said chains 17 is such, that the chains lie loosely beneath the stacked timber on the timber bunks 1, 2, when the piston rod 11 is retracted into the cylinder 9 of the jack 7 as shown at 17 in FIG. 2, but slope linearly from the attachment points 18 on the stationary stakes 5, 6 downwards to the slide member 12, when the piston rod 11 is extended to tighten said chains as shown at 19 in FIG. 2.

When the timber on the loaded vehicle is to be unloaded, the movable stakes 3, 4 are first swung down, whereby the greater portion of the stacked timber automatically rolls down from the vehicle onto the ground under the influence of gravity. To unload the rest of the timber remaining on the timber bunks, 1, 2, the unloading device is actuated by supplying a pressure medium into the hydraulic jack 7, so that the piston rod 11 thereof is extended and the chains 17, 17 are tensioned and occupy the position 19 of FIG. 2, whereby the timber rolls down the sloping ramp formed by said tensioned chains.

Figure 3:
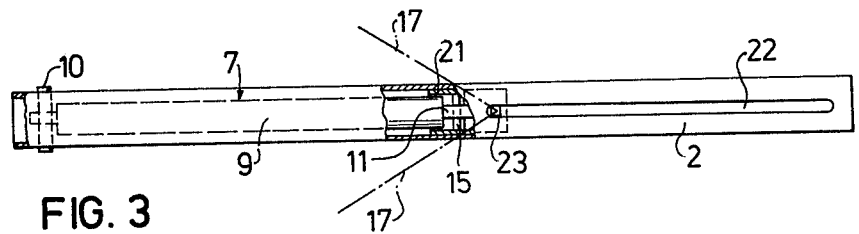
Figure 4:
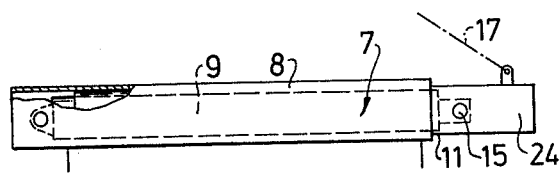
Figure 5:
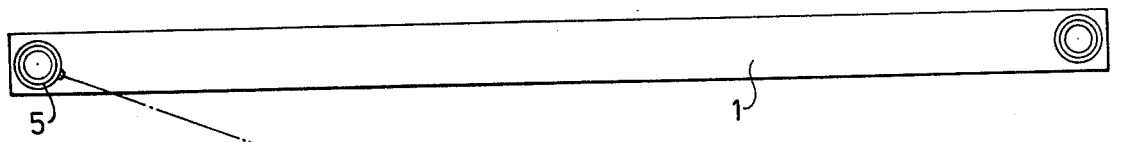
Figure 5:
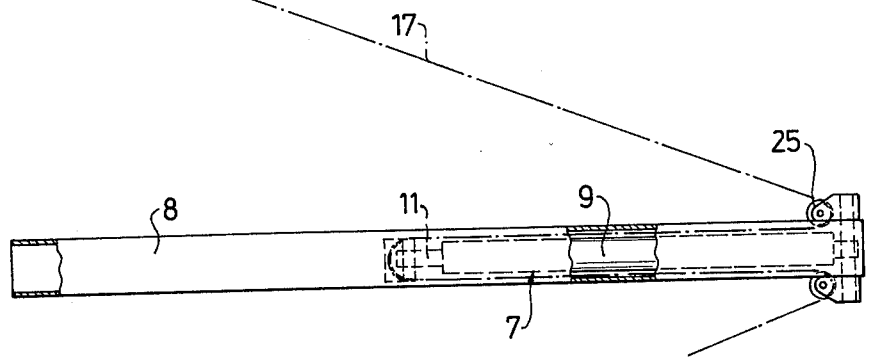
Figure 5:
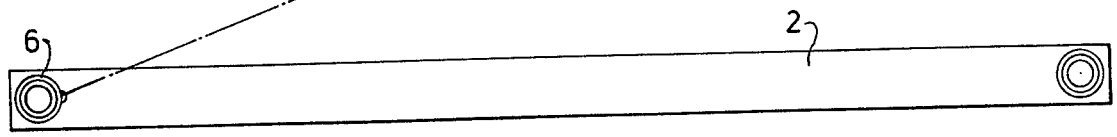

The embodiments according to FIGS. 3 -5 principally work in the same manner as the embodiment described above under reference to FIGS. 1 and 2. The only difference between the embodiments lies in the construction of the means for connecting the piston rod 11 of the jack 7 with the movable chain ends. The same reference numerals have therefore been used to denote those members which are alike in all the embodiments.

In the embodiment of FIG. 3 which shows the device as seen from above, the piston rod 11 of the hydraulic jack 7 is connected to a tubular member 21 over the transverse pivot 15, which tubular member 21 is axially displaceably but non rotatably guided inside the tube 8. Said tube 8 extends longitudinally beyond the retracted jack 7 a distance which is greater than the length of the working stroke of said jack, and a longitudinally extending slot 22 is arranged in the top or bottom side of said tube 8. An attachment lug 23, arranged on said tubular member 21, protrudes through said slot 22 and the movable ends of the chains 17 are anchored in said lug 23. When the hydraulic jack 7 is extended, the tubular member 21 is displaced outwardly relatively to the tube 8, and the chains 17 are tensioned over the lug 23, when the piston rod 11 of the jack 7 is retracted, the chains are slackened.

In the embodiment according to FIG. 4, showing an elevation of the device, the tube 8 surrounding the hydraulic jack 7 has a length substantially equal to the length of said jack in its retracted condition. A tubular member 24 of greater length than the tube 8 is axially displaceably but non rotatably accommodated within the tube 8, and the protruding end thereof is swingably connected to the piston rod 11 of the jack over the transverse pivot 15. The movable ends of the chains 17 are also anchored to the protruding end of said tubular member 24.

The maximal length of the working stroke of the jack 7 is such, that the guiding action between the tube 8 and the tubular member 24 is maintained during the whole stroke of the jack 7.

In the last two embodiments described above, the section of the tube is preferably non-circular, for instance square or rectangular, and the tubular member 21 and 24, respectively, has a corresponding section, so that relative rotation between said elements is prevented.

In the embodiment of FIG. 5 the prime mover 7 of the unloading device, arranged between the timber bunks 1, 2, also comprises a hydraulic jack 7 surrounded by a tube 8, the cylinder 9 of the jack being connected to the end of the tube 8, which is pointing in the unload direction. The chains, or in this case preferably lines 17, are at one end attached to the stationary stakes 5, 6 at a point 18 a distance above the support, i.e. at the side of the vehicle opposite to the unload side. The lines 17 run below the stacked timber on the timber bunks 1, 2 out to the abovementioned end of the tube 8, where they pass over idle pulleys 25, arranged at this end outside of the tube 8. From the pulleys 25 the lines 17 extend into the interior of the tube 8 through openings in the wall thereof and along said tube between its wall and the jack cylinder 9. The ends of the lines 17 within the tube 8 are anchored to the end of the piston rod 11 of the jack 7, preferably over a slide element, which is displaceably guided within said tube 8.

When the jack 7 is extended from its retracted condition, a greater length of the lines 17 is pulled into the tube 8, and the portions of the lines 17 outside of the tube 8 are tensioned between said pulleys 25 and the attachment points 18 on the stationary stakes 5, 6 of the timber bunks 1, 2.

In the shown embodiments the device comprises two chains or lines 17, one on each side of the prime mover 7 in the tube 8, which chains or lines extend from said prime mover to stakes laterally spaced on both sides of the prime mover. However, it is also possible to provide the device with only one chain or line or more than two chains or lines 17, for instance three, of which two extend to two laterally spaced stakes, such as the stakes 5, 6 and one to a stake positioned centrally between the first mentioned stakes.

It is also possible to use a type of prime mover other than a hydraulic jack, for instance a screw and nut mechanism or a rack and pinion arrangement. The tube 8 may also be replaced by a channel girder.

The prime mover of the unloaded device according to the invention is preferably actuated from the driver cabin of the vehicle, in which case the risks of accidents are very small.

What I claim is:

1. An apparatus for unloading timber from a loading platform of a vehicle and the like, said timber being stacked on a support such as, on timber bunks between at least two stationary stakes at one side of said platform and at least two removable stakes at the other side thereof, said apparatus comprising: a linearly reciprocating prime mover defined by a hydraulic jack enclosed in a non-circular tube extending beyond said jack and is provided with two longitudinal slots in two opposing side faces, said slots forming a guide for a slide member, and being secured to said platform beneath said said support, extending perpendicularly relative to said platform sides and centrally between said stationary stakes, and at least two elongated flexible members, each having a first end secured to each one of said stationary stakes at a distance upward from said support, the second end of each of said elongated members being attached to said prime mover through said slide member for lateral displacement of said platform upon reciprocation of said prime mover, whereby said elongated members which normally are loosely disposed along said stationary stakes and pass in under said stacked timber, are caused to be tensioned, as said second ends are laterally displaced, thereby forming a sloping ramp along which said timber moves down from said support.

2. An apparatus as claimed in claim 1, in which said prime mover is a hydraulic jack enclosed in a non-circular tube of rectangular cross-section and being hinged at the end of said tube pointing in the unload direction, an idle pulley for each of said elongated flexible members being arranged outside of said tube, whereby each of said elongated flexible members passes around said pulley through an opening in the wall of said tube and along said jack to the opposite end thereof, at which end said second ends are anchored.

3. An apparatus for unloading timber from a loading platform of a vehicle and the like, said timber being stacked on a support such as, on timber bunks between at least two stationary stakes at one side of said platform and at least two removable stakes at the other side thereof, said apparatus comprising: a linearly reciprocating prime mover, said prime mover being a hydraulic jack linked to an axially displaceable tubular member being non-rotationally guided in a tube surrounding said hydraulic jack, secured to said platform beneath said support, extending perpendicularly relative to said platform sides and centrally between said stationary stakes, and at least two elongated flexible members, each having a first end secured to each one of said stationary stakes at a distance upward from said support, the second end of each of said elongated members being attached to said prime mover through said slide member for lateral displacement of said platform upon reciprocation of said prime mover, the second ends of said elongated members being anchored to an end of said tubular member extending from said tube, whereby said elongated members which normally are loosely disposed along said stationary stakes and pass in under said stacked timber, are caused to be tensioned, as said second ends are laterally displaced, thereby forming a sloping ramp along which said timber moves down from said support.

4. An apparatus as claimed in claim 3, wherein: said tube extending beyond said jack and said tubular member being provided with an attachment lug for the second ends of said elongated flexible members, which lug is guided in a longitudinal slot in said tube.

* * * * *